United States Patent
Bielat et al.

Patent Number: 5,183,831
Date of Patent: Feb. 2, 1993

[54] RADIATION CURABLE COMPOSITION WITH HIGH TEMPERATURE OIL RESISTANCE

[75] Inventors: Richard A. Bielat, Sterling Heights, Mich.; Kieran F. Drain, Munchenstein, Switzerland

[73] Assignee: Ciba-Geigy Corporation, Ardsley, N.Y.

[21] Appl. No.: 748,590

[22] Filed: Aug. 22, 1991

[51] Int. Cl.$^5$ ............................................. C08F 2/46
[52] U.S. Cl. .................................... 522/33; 522/92; 525/452; 525/523; 526/208; 526/301
[58] Field of Search .................... 522/33, 92; 525/452, 525/523; 526/208, 301

[56] References Cited

U.S. PATENT DOCUMENTS

| | | | |
|---|---|---|---|
| 3,073,788 | 1/1963 | Hastettler | 260/2.5 |
| 3,169,945 | 2/1965 | Hastettler | 260/78.3 |
| 4,479,984 | 10/1984 | Levy et al. | 522/92 |
| 4,618,635 | 10/1986 | Osborn et al. | 524/113 |
| 4,772,716 | 9/1988 | Mulhaupt et al. | 548/110 |

Primary Examiner—Maurice J. Welsh
Assistant Examiner—Rachel Johnson
Attorney, Agent, or Firm—JoAnn Villamizar

[57] ABSTRACT

The present invention relates to a radiation curable composition with high temperature oil resistance comprising
(1) a(meth)acrylated urethane component comprising
  (a) the reaction product of hydroxyethyl(meth)acrylate and a monomeric or polymeric aromatic isocyanate,
  (b) hydroxyethyl(meth)acrylate, and optionally
  (c) a(meth)acylated prepolymer of a monomeric of polymeric aromatic isocyanate and at least one polycaprolactone polyol with a functionality $\geq 2$ and a molecular weight in the range of about 500 to about 3,000 or (d) a(meth)acrylated prepolymer of a monomeric or polymeric aromatic isocyanate and at least one polyether polyol with a functionality $\geq 2$ and a molecular weight in the range of about 90 to about 7,000, or a mixture of (c) and (d);
(2) an aromatic multifunctional epoxy (meth)acrylate having a molecular weight of less than about 1000;
(3) at least one free radical polymerizable monomer; and
(4) a free radical photoinitiator, which composition exhibits at 25° C. (i) a Tg greater than about 45° C., (ii) an elongation of greater than about 3%, (iii) a tensile strength of greater than about 1300 psi and (iv) a shear storage modulus of greater than about 4300 psi.

30 Claims, No Drawings

RADIATION CURABLE COMPOSITION WITH HIGH TEMPERATURE OIL RESISTANCE

BACKGROUND OF THE INVENTION

The present invention is directed to a radiation curable composition with high temperature oil resistance useful in adhesive applications requiring a combination of chemical, temperature and fatigue resistance, in particular in the construction of oil and chemical filters.

Prior art adhesives useful in the construction of oil and chemical filters are PVC plastisol in nature and require a heat cure. The radiation curable composition of the present invention offers significant productivity improvements over the prior art heat cured adhesives in terms of lowering of cure time.

As compared with existing UV curable adhesives, the radiation curable composition of the present invention offers a unique combination of temperature resistance, chemical resistance and toughness.

Accordingly, it is a primary object of the present invention to provide a radiation curable composition which exhibits at 25° C.: :(i) a Tg greater than about 45° C., (ii) an elongation of greater than about 3%, (iii) a tensile strength of greater than about 1300 psi and (iv) a shear storage modulus of greater than about 4300 psi.

Further objects and advantages of this invention will become apparent from the following descriptive material and illustrative examples.

SUMMARY OF THE INVENTION

The present invention provides a radiation curable composition with high temperature oil resistance useful in adhesive applications requiring a combination of chemical, temperature and fatigue resistance.

DETAILED DESCRIPTION OF THE INVENTION

The present invention relates to a radiation curable composition with high temperature oil resistance comprising (1) a (meth)acrylated urethane component comprising
  (a) the reaction product of hydroxyethyl(meth)acrylate and a monomeric or polymeric aromatic isocyanate,
  (b) hydroxyethyl(methy)acrylate, and optionally
  (c) a (meth)acrylated prepolymer of a monomeric or polymeric aromatic isocyanate and at least one polycaprolactone polyol with a functionality $\geq 2$ and a molecular weight in the range of about 500 to about 3,000, or
  (d) a (meth)acrylated prepolymer of a monomeric or polymeric aromatic isocyanate and at least one polyether polyol with a functionality $\geq 2$ and a molecular weight in the range of about 90 to about 7,000, or a mixture of (c) and (d);

(2) an aromatic multifunctional epoxy (meth)acrylate having a molecular weight of less than about 1000;

(3) at least one free radical polymerizable monomer; and (4) a free radical photoinitiator, which composition exhibits at 25° C.: :(i) a Tg greater than about 45° C., (ii) an elongation of greater than about 3%, (iii) a tensile strength of greater than about 1300 psi and (iv) a shear storage modulus of greater than about 4300 psi.

The (meth)acrylated urethane component provides the composition with excellent toughness and low shrinkage. The (meth)acrylated urethane component is prepared by reacting the monomeric or polymeric aromatic isocyanate with an excess of hydroxyethyl(methy)acrylate, preferably hydroxyethylmethacrylate (HEMA), thereby producing components (a) and (b).

Component (a) is present in an amount ranging from about 50 to about 99wt %, preferably about 80 to about 99 wt %, and most preferably about 94 wt %, based upon the total weight of component (1).

Component (b) is present in an amount ranging from about 1 to about 50 wt %, preferably about 1 to about 20 wt %, and most preferably about 6 wt %, based upon the total weight of component (1).

Suitable aromatic isocyanates include methylene bis(4-isocyanato benzene), toluene diisocyanate, 3,3'-toluidine-4,4'-diisocyanate, 3,3'-dimethyl-diphenylmethane-4,4'-diisocyanate, 1,5-diisocyanato-naphthalene, 1,4-diisocyanato-benzene and 1,4- and 1,3-di(isocyanato-dimethyl)-benzene. Preferably, methylene bis(4-isocyanato benzene) is used. Monomeric aromatic isocyanates are preferred although the polymeric aromatic isocyanates are also suitable. The polymeric aromatic isocyanates preferably have a molecular weight of about 250 to about 500, most preferably, about 250 and have a functionality of about 2 to about 3, preferably about 2.0.

The (meth)acrylated urethane component can, in addition to components (a) and (b), further comprise component (c), (d) or a mixture thereof. The mixture can be prepared by reacting the aromatic isocyanate and the polycaprolactone polyol and/or the polyether polyol to form a prepolymer. The prepolymer is then reacted with the hydroxyethyl(meth)acrylate, preferably HEMA.

The reaction of the polyol with the aromatic isocyanate is carried out under nitrogen and at a temperature of from about 40° C. to about 100° C., preferably from about 60° C. to about 90° C. and most preferably from about 80° C. to about 85° C., for about 2 to about 24 hours depending upon the reaction temperature. Hydroxyethyl(meth)acrylate is then added to the reaction mixture, preferably with an inhibitor, at the same temperature and the reaction is continued for about 3 to about 5 hours. Suitable inhibitors include butylated hydroxyl toluene, hydroquinone, phenothiazine, monomethylether of hydroquinone, napthaquinone, benzoquinone and the like.

Suitable polycaprolactone polyols that can be used to prepare component (c) include any of the known polycaprolactone polyols that are commercially available and that are fully described, for example, in U.S. Pat. No. 3,169,945. As described in this patent the polycaprolactone polyols are produced by the ring-opening polymerization of an excess of a caprolactone and an organic polyfunctional initiator having at least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, neopentyl glycol, 1,4-cyclohexanedimethanol, 2,4,4-trimethyl-pentanediol, 2,2-dimethyl-3-hydroxypropyl, 2,2-dimethyl-3-hydroxypropionate, and similar polyalkylene glycols, either blocked, capped or heteric, containing up to about 40 or more alkyleneoxy units in the molecule, 3-methyl-1,5-pentandiol, cyclohexanediol, 4,4'-methylene-biscyclohexanol, 4,4'-isopropylidene bis-cyclohexanol, xylenediol, 2-(4-hydroxymethylphenyl) ethanol, 1,4-butanediol, 1,6-hexanediol and the like; triols such as glycerol, trimethylolpropane, 1,2,6-hexanetriol, triethanolamine, triisopropanolamine, and the like, tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

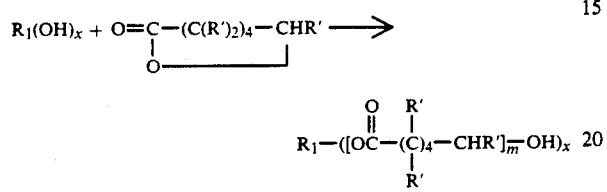

In this equation the organic functional initiator is the $R_1(OH)_x$ compound and the caprolactone is the

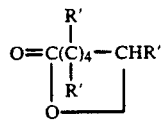

compound; this can be epsilon-caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from about 500 to about 3,000. The preferred polycaprolactone polyol compounds are those having an average molecular weight of from about 500 to about 3000, most preferably from about 800 to about 2000. The most preferred are the polycaprolactone diol compounds having an average molecular weight of from about 800 to about 1200 and the polycaprolactone triol and tetrol compounds having an average molecular weight of from about 800 to about 1000. In the formula, m is an integer representing the average number of repeating units needed to produce the compound having said molecular weights. The hydroxyl number of the polycaprolactone polyol can be from about 30 to about 600, preferably from about 100 to about 200; and the polycaprolactone can have an average of from about 2 to about 8, preferably 2 to 4, hydroxyl groups.

Illustrative of polycaprolactone polyols that can be used in the compositions of this invention, one can mention the reaction products of a polyhydroxyl compound having an average from 2 to 6 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone polyol shown in the second column. Knowing the molecular weights of the initiator and of the polycaprolactone polyol one can readily determine the average number of molecules of caprolactone (CPL Units) that reacted to produce the compounds; this figure is shown in the third column.

| Initiator | Average MW of polyol | Average No. of CPL units in molecules |
|---|---|---|
| Ethylene glycol | 290 | 2 |
| Ethylene glycol | 803 | 6.5 |
| Ethylene glycol | 2114 | 18 |
| Propylene glycol | 874 | 7 |
| Octylene glycol | 602 | 4 |
| Decalene glycol | 801 | 5.5 |
| Diethylene glycol | 527 | 3.7 |
| Diethylene glycol | 847 | 6.5 |
| Diethylene glycol | 1246 | 10 |
| Diethylene glycol | 1998 | 16.6 |
| Diethylene glycol | 3526 | 30 |
| Triethylene glycol | 754 | 5.3 |
| Polyethylene glycol (MW 200)* | 713 | 4.5 |
| Polyethylene glycol (MW 600)* | 1398 | 7 |
| Polyethylene glycol (MW 1500)* | 2868 | 12 |
| 1,2-Propylene glycol | 646 | 5 |
| 1,3-Propylene glycol | 988 | 8 |
| Dipropylene glycol | 476 | 3 |
| Polypropylene glycol (MW 425)* | 835 | 3.6 |
| Polypropylene glycol (MW 1000)* | 1684 | 6 |
| Polypropylene glycol (MW 2000)* | 2456 | 4 |
| Hexylene glycol | 916 | 7 |
| 2-Ethyl-1,3-hexanediol | 602 | 4 |
| 1,5-Pentanediol | 446 | 3 |
| 1,4-Cyclohexanediol | 629 | 4.5 |
| 1,3-Bis(hydroxyethyl)-benzene | 736 | 5 |
| Glycerol | 548 | 4 |
| 1,2,6-Hexanetriol | 476 | 3 |
| Trimethylolpropane | 590 | 4 |
| Trimethylolpropane | 750 | 5.4 |
| Trimethylolpropane | 1103 | 8.5 |
| Triethanolamine | 890 | 6.5 |
| Erythritol | 920 | 7 |
| Pentaerythritol | 1219 | 9.5 |
| 1,4-Butanediol | 546 | 4.0 |
| Neopentyl glycol | 674 | 5.0 |

*Average molecular weight of glycol.

The structures of the compounds in the above tabulation are obvious to one skilled in the art based on the information given. The structure of 7th compound in the table above is idealized as:

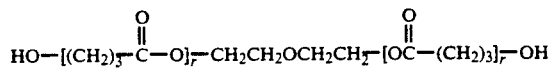

wherein the variable r is an integer, the sum of r+r has an average value of 3.7 and the average molecular weight is 527. The structure of 20th compound in the table above is idealized as:

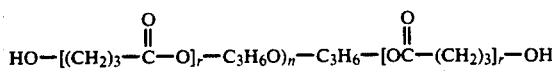

wherein the sum of r+r has an average value of 6 and the average molecular weight is 1,684. This explanation makes explicit the structural formulas of the compounds set forth above.

Polycaprolcatone hexols suitable for use in the present invention can be prepared by the catalytic polymerization of an excess of polycaprolactone polyols and a cycloaliphatic epoxide. Illustrative polycaprolactone polyols useful in the preparation of polycaprolactone hexols include polycaprolactone diols, polycaprolactone triols and the like, including mixtures thereof. Many of these polycaprolactone polyols are commercially available from Union Carbide Corporation. Cycloaliphatic epoxides suitable for use in preparing the polycaprolactone hexols include 3,4-epoxycyclohexyl-methyl-3,4-epoxycyclohexane carboxylate, bis(3,4-epoxycyclohexylmethyl) adipate, vinyl cyclohexene dioxide and the like. Many of these cycloaliphatic epoxides are commercially available from Union Carbide Corporation. A suitable polymerization catalyst is diethylammonium triflate which is commercially available from the 3M Company as FC-520.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to a nil or almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolactone triols to a molten state. Preferred polycaprolactone hexols have an average molecular weight of from about 500 to about 3000.

TONE ®-0310 from Union Carbide Corporation is the preferred polycaprolactone polyol. Component (c) preferably is the reaction product of methylene bis(4-isocyanatobenzene) and a polycaprolactone triol.

The polycaprolactone polyol is reacted with the aromatic isocyanate, preferably, methylenebis(4-isocyanatobenzene), in a molar ratio of about 0.2:1 to about 0.6:1 preferably about 0.3:1 to about 0.5:1, and most preferably about 0.4:1 to produce the prepolymer of component (c).

Preparation of a mixture of (a), (b) and (c) is exemplified in reaction scheme 1 (an excess of HEMA is used thereby producing (b) which is not shown):

Reaction Scheme 1

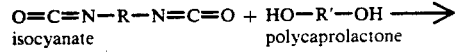

-continued

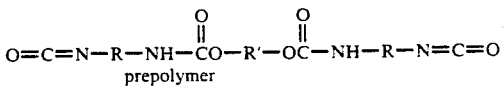
prepolymer

Primary

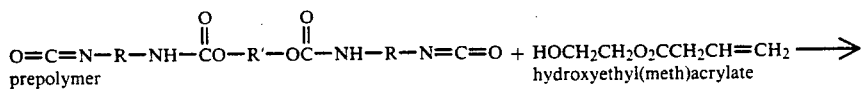

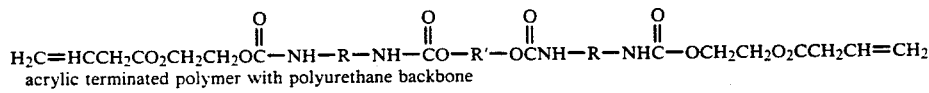
acrylic terminated polymer with polyurethane backbone

Competing

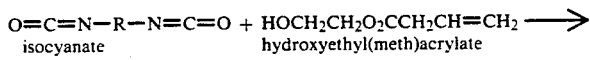

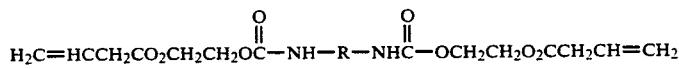

When component (1) contains component (a), (b) and (c), component (a) is present in an amount ranging from about 5 to about 35 wt %, preferably about 10 to about 30 wt %, and most preferably about 23 wt %, based upon the total weight of component (1). Component (b) is present in an amount ranging from about 1 to about 20 wt %, preferably about 1 to about 10 wt %, and most preferably about 6 wt %, based upon the total weight of component (1). Component (c) is present in an amount ranging from about 50 to about 90 wt %, preferably about 70 to about 80 wt %, and most preferably about 71 wt %, based upon the total weight of component (1).

Component (1) may further include, in addition to or in lieu of component (c), a (meth)acrylated prepolymer of a monomeric or polymeric aromatic isocyanate and at least one polyether polyol with a functionality of $\geq 2$ and a molecular weight in the range of about 90 to about 7,000 (i.e. component (d)).

Suitable polyether polyols include alkylene oxide adducts of polyhydroxyalkanes; alkylene oxide adducts of non-reducing sugars and sugar derivatives and the polyols from natural oils such as caster oil and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glycoside, and the like, as well as the alkylene oxide adducts of the alkyl glycosides as set forth in U.S. Pat. No. 3,073,788.

The polyols described hereinabove can have hydroxyl numbers which vary over a wide range. In general, the hydroxyl numbers of the above described polyols employed in this invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = [(56.1 \times 1000 \times f)/m.w.]$$

where
OH = hydroxyl number of the polyol;

f = functionality, that is, average number of hydroxyl groups per molecule of polyol; and
m.w. = molecular weight of the polyol.

Further polyether polyols which are suitable for the preparation of component (d) include poly(oxypropylene)-poly(oxyethylene) block copolymers and nitrogen containing polyether polyols such as poly(oxyethylene)-poly(oxypropylene) block copolymers with ethylenediamine.

The polyether polyols described hereinabove can be prepared by conventional methods and are commercially available from a number of manufacturers. The preferred polyether polyols are poly(oxypropylene)-poly(oxyethylene) block copolymers.

The polyether polyol is reacted with the aromatic isocyanate, preferably, methylenebis(4-isocyanatobenzene), in a molar ratio of about 0.1:1 to about 0.8:1, preferably about 0.1:1 to about 0.3:1 mole, and most preferably about 0.2:1 to produce the prepolymer of component (d).

Preparation of a mixture of (a), (b) and (d) is exemplified in reaction scheme 2 and preparation of a mixture of (a), (b), (c) and (d) is exemplified in reaction scheme 3 as follows (an excess of HEMA is used thereby producing (b) which is not shown):

Reaction Scheme 2

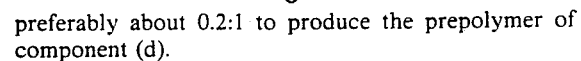

Primary

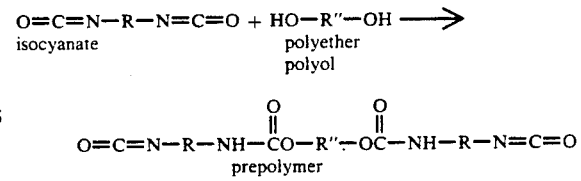

Competing

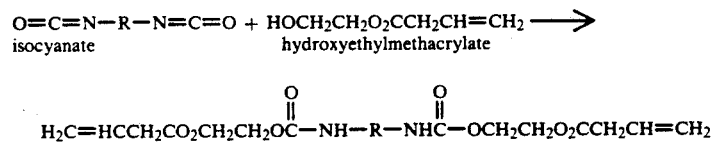

Reaction scheme 3

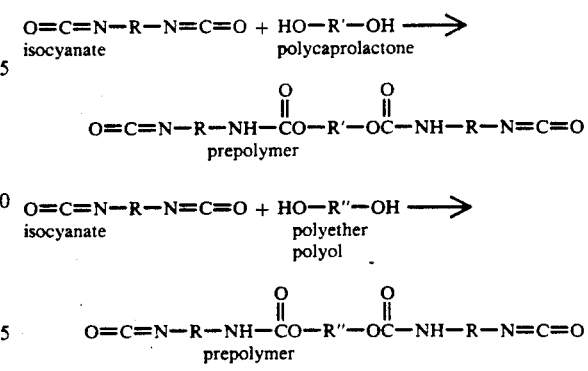

Primary

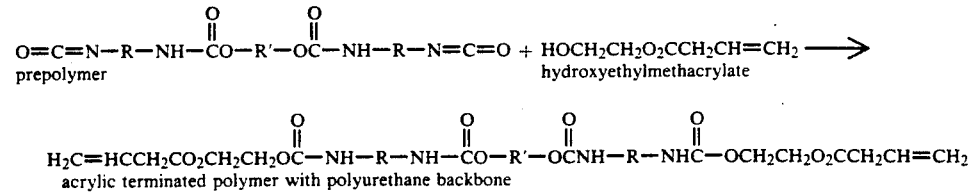

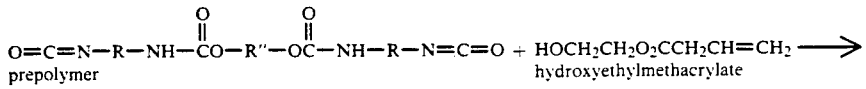
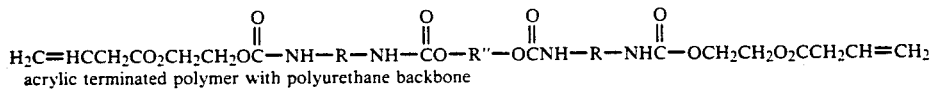

acrylic terminated polymer with polyurethane backbone

Competing

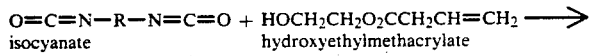

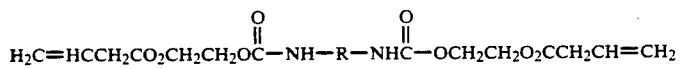

When component (1) contains components (a), (b) and (d), component (a) is present in an amount ranging from about 10 to about 30 wt %, preferably about 20 to about 30 wt %, and most preferably about 23 wt %, based upon the total weight of component (1). Component (b) is present in an amount ranging from about 1 to about 20 wt %, preferably about 5 to about 15 wt %, and most preferably about 6 wt %, based upon the total weight of component (1). Component (d) is present in an amount ranging from about 50 to about 90 wt %, preferably about 60 to about 90 wt %, and most preferably about 71 wt %, based upon the total weight of component (1).

When component (1) contains components (a), (b), (c) and (d), component (a) is present in an amount ranging from about 50 wt %, preferably about 20 to about 30 wt %, and most preferably about 23 wt %, based upon the total weight of component (1). Component (b) is present in an amount ranging from about 1 to about 20 wt %, preferably about 5 to about 15 wt %, and most preferably about 6 wt %, based upon the total weight of component (1). Component (c) is present in an amount ranging from about 1 to about 10 wt %, preferably about 1 to about 5 wt %, and most preferably about 3 wt %, based upon the total weight of component (1). Component (d) is present in an amount ranging from about 25 to about 75 wt %, preferably about 50 to about 75 wt %, and most preferably about 68 wt %, based upon the total weight of component (1).

Component (1) preferably includes components (a), (b), (c) and (d). In a particularly preferred embodiment, component (1) comprises
(a) the reaction product of hydroxyethylmethacrylate and methylene bis(4-isocyanato benzene),
(b) hydroxyethylmethyacrylate,
(c) a methacrylated prepolymer of methylene bis(4-isocyanato benzene) and at least one polycaprolactone polyol with a functionality $\geq 2$ and a molecular weight in the range of about 500 to about 3,000, and
(d) a methacrylated prepolymer of methylene bis(4-isocyanato benzene) and at least one polyether polyol with a functionality $\geq 2$ and a molecular weight in the range of about 90 to about 7,000.

Suitable aromatic multifunctional epoxy (methy)acrylates include virtually all aromatic epoxy resins containing on average at least two 1,2-epoxy groups per molecule which can be (meth)acrylated by methods well known in the art.

Illustrative examples of such aromatic multifunctional epoxy resins are:

Polyglycidyl and poly($\beta$-methylglycidyl) ethers which may be obtained by reacting a compound containing at least two phenolic hydroxyl groups in the molecule with epichlorohydrin, glycerol dichlorohydrin or with $\beta$-methyl epichlorohydrin under alkaline conditions or in the presence of an acid catalyst, and subsequent treatment with an alkali. Illustrative of compounds containing at least two phenolic hydroxyl groups in the molecule are alcohols containing aromatic groups such as N,N-bis(2-hydroxyethyl)aniline or p,p'-bis(2-hydroxyethylamino)diphenylmethane; or mono- or polynuclear polyphenols such as resorcinol, hydroquinone, bis(4-hydroxyphenyl)methane, 2,2-bis(4-hydroxyphenyl)propane, brominated 2,2-bis(4-hydroxyphenyl)propane, bis(4-hydroxyphenyl) ether, bis(4-hydroxyphenyl)sulfone, 1,1,2,2-tetrakis(4-hydroxyphenyl) ethane or novolaks which are obtainable by condensation of aldehydes such as formaldehyde, acetaldehyde, chloral or furfuraldehyde with phenols or alkyl- or halogen-substituted phenols such as phenol, the above described bisphenols, 2- or 4-methylphenol, 4-tert-butylphenol, p-nonylphenol or 4-chlorophenol.

Poly(N-glycidyl) compounds which may be obtained by dehydrochlorinating the reaction products of epichlorohydrin with amines which contain at least two amino hydrogen atoms. Amines from which these epoxy resins are derived are, typically, aromatic amines such as aniline, p-toluidine, bis(4-aminophenyl) methane, bis(4-aminophenyl) ether, bis(4-aminophenyl)sulfone, 4,4'-diaminobiphenyl or 3,3'-diaminobiphenyl; or araliphatic amines such as m-xylylenediamine.

Poly(S-glycidyl) derivatives, for example bis(S-glydicyl) derivatives which are derived from bis(4-mercaptomethylphenyl) ether.

It is also possible, however, to use epoxy resins in which the 1,2-epoxy groups are attached to different hetero atoms or functional groups. These compounds, comprise, for example, the N,N,O-triglycidyl derivative of 4-aminophenol, the N,N,O-triglycidyl derivative of 3-aminophenol or the glycidyl ester of salicylic acid.

Preferred aromatic multifunctional epoxy (meth)acrylates include acrylated diglycidyl ether bisphenol A, acrylated epoxy novolacs, amino modified bisphenol A epoxy acrylates, rubber modified acrylated epoxies and fatty acid modified epoxy acrylates.

The aromatic multifunctional epoxy (meth)acrylate is present in a range of from about 10 to about 60 wt %, preferably about 10 to about 40 wt %, most preferably about 20 to about 30 wt %.

At least one free radical polymerization monomer is included as a diluent. Suitable free radical polymerization monomers include vinylic coreactants such as N-vinyl pyrrolidone, N-vinyl caprolactam and N,N-dimethylacrylamide, alkylene glycol vinyl ethers, vinyl toluene, styrene, divinyl benzene and the like, acrylates and methacrylates such as ethylene glycol dimethacrylate, isobornyl acrylate, phenoxyethyl acrylate, acrylates and methacrylates of polyols such as trimethylol propane trimethacrylate and pentaerythritol, allylic compounds such as triallyl isocyanurate, diallylphthalate, tetraallyl pyromellitate, o,o'-diallyl bisphenol A, eugenol, aryl allyl ethers such as the diallyl ether of bisphenol A, acrylic ester with 3-(2-hydroxyethyl)-2-oxazolidone, 2-propenoic acid-2-[[1-methyl ethoxy carbonyl]amino] ethyl ester and the like. N-vinyl pyrrolidone, N-vinyl caprolactam, acrylic ester with 3-(2-hydroxyethyl)-2-oxazolidone, 2-propenoic acid-2-[[1-methyl ethoxy carbonyl]amino] ethyl ester N,N-dimethylacrylamide and phenoxyethyl acrylate are preferred.

The free radical polymerization monomer is present in an amount of from about 5 to about 40 wt %, preferably about 10 to about 30 wt %, most preferably about 20 to about 30 wt %.

Illustrative of suitable free radical photoinitiators for use in the composition according to the present invention are 2,2-diethyloxyacetophenone, 2- or 3- or 4-bromoacetophenone, 3- or 4-allylacetophenone, 2-acetonaphthone, benzaldehyde, benzoin, the alkyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, thioxanthone, 2-chlorothioxanthone, methylthioxanthone, α,α,α-trichloro para t-butyl acetophenone, 4-methoxybenzophenone, 3-chloro-8-nonylxanthone, 3-iodo-7-methoxyxanthone, benzaldehyde, carbazole, 4-chloro-4'-benzyl-benzophenone, fluorene, fluorene-one, 1,4-naphthylphenylketone, 2,3-pentanedione, 2,2-di-sec-butoxy acetophenone, dimethoxyphenyl acetophenone, propiopheneone, chlorothioxanthone, xanthone and the like, or mixtures of these. The foregoing list is meant to be illustrative only and is not meant to exclude any suitable photoinitiators known to those skilled in the art. Preferably, The photoinitiator used is dimethoxy phenyl acetophenone. The photoinitiator is present in an amount of from about 0.1 to about 5.0 wt %, preferably about 0.1 to about 3.0 wt %, most preferably about 1 to about 3 wt %.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexyl-ethylenimine, piperidine, N-methylpiperazine, 2,2-dimethyl-1,3-bis(3-N-morpholinyl) propionyloxypropane, and the like, or any combination of these.

The compositions of this invention can also be cured upon exposure to any source of radiation emitting actinic radiation at a wavelength within the ultraviolet spectral region. Suitable sources of radiation include mercury, xenone, carbon arc lamps, etc. Exposures may be from less than about 1 second to 10 minutes or more depending upon the amounts of particular polymerizable materials and photoinitiator being utilized and depending upon the radication source and distance from the source and the thickness of the coating to be cured. The compositions may also be photopolymerized by exposure to electron beam radiation. Generally speaking the dosage necessary is from less than 1 megarad to 100 megarads or more.

The compositions of the invention may also contain other conventional modifiers such as extenders, fillers and reinforcing agents, pigments, dyestuffs, organic solvents, plasticizers, tackifiers, rubbers, diluents, and the like. As extenders, reinforcing agents, fillers and pigments which can be employed in the compositions according to the invention there may be mentioned, for example: glass fibers, glass balloons, boron fibers, carbon fibers, cellulose, polyethylene powder, polypropylene powder, mica, asbestos, quartz powder, gypsum, antimony trioxide, bentones, talc, silica aerogel ("Aerosil"), fumed silica, lithopone, barite, calcium carbonate, titanium dioxide, carbon black, graphite, iron oxide, or metal powders such as aluminum powder or iron powder. The preferred fillers are glass balloons and sodium potassium aluminum silicate. It is also possible to add other usual additives, for example, agents for conferring thixotropy, flow control agents such as silicones, cellulose acetate butyrate, polyvinyl butyral, stearates and the like.

A vertical type high-speed agitator, kneading machine, roll machine, ball mill or any other suitable mixing and agitating machine may be used for dispersion of the components of the composition of the present invention.

The radiation curable composition of this invention exhibits at 25° C.: (i) a Tg greater than about 45° C., (ii) an elongation of greater than about 3%, (iii) a tensile strength of greater than about 1300 psi and (iv) a shear storage modulus (G') of greater than about 4300 psi. Preferred compositions are those which exhibit at 25° C.: (i) a Tg between about 50° C. and about 120° C., (ii) an elongation between about 3% and about 8%, (iii) a tensile strength between about 2000 psi and about 3000 psi, and (iv) a shear storage modulus (G') between about 4300 psi and about 43.000 psi.

The radiation curable composition of this invention is particularly suitable in adhesive applications requiring a combination of chemical, temperature and fatigue resistance, in particular in the construction of oil and chemical filters, due to their flexibility, impact resistance, hardness, thermal resistance, chemical resistance, fatigue resistance and adhesion to rigid, resilient and flexible substrates, such as metal, plastic, glass, rubber, paper, wood and ceramics.

The following examples serve to give specific illustration of the practice of this invention but they are not intended in any way to act to limit the scope of this invention.

EXAMPLE 1

This example illustrates the preparation of a typical mixture of acrylates urethanes (Component 1) with the addition of N-vinyl pyrrolidone:

| Reactants | % by weight |
|---|---|
| PLURACOL ® P220 | 56.11 |
| (polyether polyol from BASF, Parsippany, N.J.) | |
| MONDUR ® M Flaked MDI | 17.455 |
| (1,1-methylenebis(4-isocyanatobenzene) from | |
| Mobay, Pittsburg PA) | |
| TONE ® 0310 polycaprolactone triol | 2.65 |
| (Union Carbide Corporation) | |
| BHT Intermediate | 14.695 |
| (mixture of hydroxyethylmethacrylate and | |
| butylated hydroxyl toluene in a 99.601 to | |
| 0.309 ratio) | |
| N-vinyl pyrrolidone | 9.09 |

The reaction vessel is cleaned, dried and deairated by drawing a vacuum and releasing the vacuum with nitrogen. The temperature is set to 71° C. With a nitrogen purge, the 1,1-methylenebis(4-isocyanatobenzene) is charged to the reaction vessel. After all the 1,1-methylenebis(4-isocyanatobenzene) has been added to the reaction vessel, a non-metallic paddle is used to evenly distribute the flakes at the bottom of the reaction vessel to melt. After the 1,1-methylenebis(4-isocyanatobenzene is liquid, the polyether polyol is quickly added to the reaction flask with the agitator set on high. The polycaprolactone triol is then added. The reaction is allowed to exotherm to 82° C. or the reaction is heated and maintained between 79°-85° C. The reaction is continued until the NCO content is less than 6.60%. The nitrogen blanket is then removed, the temperature is maintained between 79°-82° C. and the BHT intermediate is added in three equal portions at 45 minute intervals. The reaction is continued until the NCO content is less than 0.30%. N-vinyl pyrrolidone is then added to the reaction mixture, the agitator is reduced to low and the reaction mixture stirred for 30 minutes. The reaction mixture is then cooled to between 63°-68° C.

EXAMPLE 2

This example illustrates the preparation of another typical mixture of acrylated urethanes (Component 1) using the procedure set forth in Example 1:

| Reactants | % by weight |
|---|---|
| PLURACOL ® P220 | 61.5 |
| (polyether polyol from BASF, Parsippany, N.J.) | |
| MONDUR ® M Flaked MDI | 19 |
| (1,1-methylenebis(4-isocyanatobenzene) from | |
| Mobay, Pittsburg PA) | |
| TONE ® 0310 polycaprolactone triol | 3 |
| (Union Carbide Corporation) | |
| BHT Intermediate | 16.5 |
| (mixture of hydroxyethylmethacrylate and | |
| butylated hydroxyl toluene in a 99.601 to | |
| 0.309 ratio) | |

EXAMPLES 3-7

These examples illustrate the preparation of typical compositions of the present invention. The formulations are provided in Table 1 and the chemical and physical properties of the cured products are provided in Tables 2 and 3 (all percentages are on a weight basis unless indicated otherwise):

TABLE 1

| *Reactants | EXAMPLES | | | | |
|---|---|---|---|---|---|
| | 3 | 4 | 5 | 6 | 7 |
| Example 1 | 55.0 | 44.0 | 64.9 | 88.6 | 59.4 |
| EBECRYL ® 3700 | 20.0 | 30.0 | 10.0 | — | — |
| NVP | — | 1.0 | 4.1 | 2.4 | 3.0 |
| PEA | 13.0 | 13.0 | — | — | — |
| TMPTA | 10.0 | 10.0 | 10.0 | — | — |
| IRGACURE ® 651 | 2.0 | 2.0 | 1.0 | 2.5 | 3.0 |
| IBOA | — | — | 10.0 | 4.5 | 6.7 |
| IDA | — | — | — | 2.0 | — |

| *Description of Reactants | |
|---|---|
| Example 1 | Component 1 with 9.09% N-vinylpyrrolidone |
| EBECRYL ® 3700 | Acrylated epoxy form Raducre Specialties, Louisville, Ky |
| NVP | N-vinylpyrrolidone |
| PEA | Phenoxyethyl acrylate |
| TMPTA | Trimethylolpropane triacrylate-Ageflex TMPTA from CPS Chemical |
| IRGACURE ® 651 | dimethoxyphenyl acetophenone from CIBA-GEIGY Corporation, Ardsley, N.Y. |
| IBOA | Isobornyl acrylate |
| IDA | Isodecyl acrylate |

The formulations are cured using the following conditions: Radiation Wavelength

| | Fusion Systems D Bulb (Rockville, MD) |
|---|---|
| Cure Time | 90 seconds |
| Distance Source from Specimen | 2.1 inches (Focus of the reflector) |
| Total Cure Dose | 4.32 W/cm$^2$ |
| Shore D Hardness | 65-75 |
| Refractive Index (25° C. Uncured) | 1.505-1.515 |
| Gardner Color | <1 |

*TABLE 2

| Physical Property | Example 3 | Example 4 |
|---|---|---|
| Tg (°C.) | 111 | 119 |
| Elongation (%) | 8 | 3 |
| Tensile Strength (psi) | 2098 | 2702 |
| Young's Modulus (kpsi) | 73 | 142 |
| Shear Storage Modulus at 25° C. (kpsi) | 38 | 43 |
| Shear Storage Modulus at 150° C. (kpsi) | 2 | 2 |
| Shear Loss Modulus at 25° C. (kpsi) | 3 | 4 |
| Tan Delta (25° C.) | 7.44E-02 | 8.61E-02 |

*TABLE 3

| Physical Property | Example 5 | Example 6 | Example 7 |
|---|---|---|---|
| Tg (°C.) | 136 | 120 | 94 |
| Elongation (%) | 7 | 46 | 36 |
| Tensile Strength (psi) | 1298 | 1634 | 2200 |
| Young's Modulus (kpsi) | 49 | 12 | 32 |
| Shear Storage Modulus at 25° C. (kpsi) | 35 | 11 | 20 |
| Shear Storage Modulus at 150° C. (kpsi) | 3 | 0.1 | 1 |
| Shear Loss Modulus at 25° C. (kpsi) | 3 | 1 | 2 |
| Tan Delta (25° C.) | 8.32E-02 | 1.11E-01 | 1.12E-01 |

*The Tg is determined by rheology using a Rheometrics RDA 700; and the percent elongation and tensile strength are measured using ASTM procedure D638-86.

What is claimed is:

1. A radiation curable composition with high temperature oil resistance comprising (1) a (meth)acrylated urethane component comprising
   (a) the reaction product of hydroxyethyl(meth)acrylate and a monomeric or polymeric aromatic isocyanate,
   (b) hydroxyethyl(meth)acrylate; and
   (c) a (meth)acrylated prepolymer of a monomeric or polymeric aromatic isocyanate and at least one polycaprolactone polyol with a functionality >2 and a molecular weight in the range of about 500 to about 3,000;
(2) an aromatic multifunctional epoxy (meth)acrylate having a molecular weight of less than about 1000;
(3) at least one free radical polymerizable monomer; and
(4) a free radical photoinitiator,
which composition exhibits at 25° C.: : (i) a Tg greater than about 45° C., (ii) an elongation of greater than about 3%, (iii) a tensile strength of greater than about 1300 psi and (iv) a shear storage modulus of greater than about 4300 psi.

2. A radition curable composition according to claim 1 wherein said aromatic isocyanate is selected from the group consisting of methylene bis(4-isocyanato benzene), toluene diisocyanate, 3,3'-toluidine-4,4'-diisocyanate, 3,3'-dimethyl-diphenylmethane-4,4'-diisocyanate, 1,5-diisocyanato-naphthalene, 1,4-diisocyanato-benzene and 1,4- and 1,3-di(isocyanato-dimethyl)-benzene.

3. A radiation curable composition according to claim 1 wherein said aromatic isocyanate is monomeric methylene bis(4-isocyanato benzene).

4. A radiation curable composition according to claim 1 wherein component (a) is present in an amount ranging from about 5 to about 35 wt wt %, based upon the total weight of component (1), component (b) is present in an amount ranging from about 1 to about 20 wt %, based upon the total weight of component (1) and component (c) is present in an amount ranging from about 50 to about 90 wt %, based upon the total weight of component (1).

5. A radiation curable composition according to claim 1 wherein component (a) is present in an amount ranging from about 10 to about 30 wt %, based upon the total weight of component (1), component (b) is present in an amount ranging from about 1 to about 10 wt %, based upon the total weight of component (1), and component (c) is present in an amount ranging from about 70 to about 80 wt %, based upon the total weight of component (1).

6. A radiation curable composition according to claim 1 wherein component (a) is present in an amount of about 23 wt %, based upon the total weight of component (1), component (b) is present in an amount of about 6 wt %, based upon the total weight of component (1), and component (c) is present in an amount of about 71 wt %, based upon the total weight of component (1).

7. A radiation curable composition according to claim 1 wherein component (a) is the reaction product of hydroxyethylmethacrylate and methylene bis(4-isocyanato benzene) and is present in an amount of 23 wt %, based upon the total weight of component (1), component (b) is hydroxyethylmethacrylate and is present in an amount of 6 wt %, based upon the total weight of component (1) and component (c) is the (meth)acrylated prepolymer of methylene bis(4-isocyanatobenzene) and a polycaprolactone triol and is present in an amount of about 71 wt %, based upon the total weight of component (1).

8. A radiation curable composition according to claim 1 wherein component (1) further comprises (d) a (meth)acrylated prepolymer of a monomeric or polymeric aromatic isocyanate and at least one polyether polyol with a functionality ≧2 and a molecular weight in the range of about 90 to about 7,000.

9. A radiation curable composition according to claim 8 wherein component (a) is present in an amount ranging from about 10 to about 50 wt %, based upon the total weight of component (1), component (b) is present in an amount ranging from about 1 to about 20 wt %, based upon the total weight of component (1), component (c) is present in an amount ranging from about 1 to about 10 wt %, based upon the total weight of component (1) and component (d) is present in an amount ranging from about 25 to about 75 wt %, based upon the total weight of component (1).

10. A radiation curable composition according to claim 8 wherein component (a) is present in an amount ranging from about 20 to about 30 wt %, based upon the total weight of component (1), component (b) is present in an amount ranging from about 5 to about 15 wt %, based upon the total weight of component (1), component (c) is present in an amount ranging from about 1 to about 5 wt %, based upon the total weight of component (1) and component (d) is present in an amount ranging from about 50 to about 75 wt %, based upon the total weight of component (1).

11. A radiation curable composition according to claim 8 wherein component (a) is present in an amount of about 23 wt %, based upon the total weight of component (1), component (b) is present in an amount of about 6 wt %, based upon the total weight of component (1), component (c) is present in an amount of about 3 wt %, based upon the total weight of component (1) and component (d) is present in an amount of about 68 wt %, based upon the total weight of component (1).

12. A radiation curable composition according to claim 8 wherein component (a) is the reaction product of hydroxyethylmethacrylate and methylene bis(4-isocyanato benzene) and is present in an amount of about 23 wt %, based upon the total weight of component (1), component (b) is hydroxyethylmethacrylate and is present in an amount of about 6 wt %, based upon the total weight of component (1), component (c) is the (meth)acrylated prepolymer of methylene bis(4-isocyanatobenzene) and a polycaprolactone triol and is present in an amount of about 3 wt %, based upon the total weight of component (1) and component (d) is the (meth)acrylated prepolymer of methylene bis(4-isocyanatobenzene) and a poly(oxypropylene)-poly(oxyethylene) block copolymer and is present in an amount of about 68 wt %, based upon the total weight of component (1).

13. A radiation curable composition according to claim 1 wherein said aromatic multifunctional epoxy (meth)acrylate is selected from the group consisting of acrylated diglycidyl ether bisphenol A, acrylated epoxy novolacs, amino modified bisphenol A epoxy acrylates, rubber modified acrylated epoxies and fatty acid modified epoxy acrylates.

14. A radiation curable composition according to claim 1 wherein said aromatic multifunctional epoxy (meth)acrylate is present in an amount of from about 10 to about 60 wt %.

15. A radiation curable composition according to claim 1 wherein said aromatic multifunctional epoxy (meth)acrylate is present in an amount of from about 10 to about 40 wt %.

16. A radiation curable composition according to claim 1 wherein said aromatic multifunctional epoxy (meth)acrylate is present in an amount of from about 20 to about 30 wt %.

17. A radiation curable composition according to claim 1 wherein said free radical polymerization monomer is selected from the group consisting of N-vinyl pyrrolidone, N-vinyl caprolactam, acrylic ester with 3-(2-hydroxyethyl)-2-oxazolidone, 2-propenoic acid-2-[[1-methyl ethoxy carbonyl]amino] ethyl ester N,N-dimethylacrylamide and phenoxyethyl acrylate.

18. A radiation curable composition according to claim 1 wherein said free radical polymerization monomer is present in an amount of from about 5 to about 40 wt %.

19. A radiation curable composition according to claim 1 wherein said free radical polymerization monomer is present in an amount of from about 10 to about 30 wt %.

20. A radiation curable composition according to claim 1 wherein said free radical polymerization monomer is present in an amount of from about 20 to about 30 wt %.

21. A radiation curable composition with high temperature oil resistance comprising
  (1) a (meth)acrylated urethane component comprising
    (a) the reaction product of hydroxyethyl(meth)acrylate and a monomeric or polymeric aromatic isocyanate, and
    (b) hydroxyethyl(meth)acrylate;
  (2) an aromatic multifunctional epoxy (meth)acrylate having a molecular weight of less than about 1000;
  (3) at least one free radical polymerizable monomer selected from the group consisting of N-vinyl pyrrolidone, N-vinyl caprolactam, acrylic ester with 3-(2-hydroxyethyl)-2-oxazolidone, 2-propenoic acid-2-[[1-methyl ethoxy carbonyl]amino] ethyl ester N,N-dimethylacrylamide and phenoxyethyl acrylate; and
  (4) a free radical photoinitiator,
which composition exhibits at 25° C.: (i) a Tg greater than about 45° C., (ii) an elongation of greater than about 3%, (iii) a tensile strength of greater than about 1300 psi and (iv) a shear storage modulus of greater than about 4300 psi.

22. A radiation curable composition according to claim 21 wherein component (a) is present in an amount ranging from about 50 to about 99 wt %, based upon the total weight of component (1) and component (b) is present in an amount ranging from about 1 to about 50 wt %, based upon the total weight of component (1).

23. A radiation curable composition according to claim 21 wherein component (a) is present in an amount ranging from about 80 to about 99 wt %, based upon the total weight of component (1) and component (b) is present in an amount ranging from about 1 to about 20 wt %, based upon the total weight of component (1).

24. A radiation curable composition according to claim 21 wherein component (a) is present in an amount of about 94 wt %, based upon the total weight of component (1) and component (b) is present in an amount of 6 wt %, based upon the total weight of component (1).

25. A radiation curable composition according to claim 21 wherein said aromatic isocyanate is selected from the group consisting of methylene bis(4-isocyanato benzene), toluene diisocyanate, 3,3'-diisocyanate, 4,4'-diisocyanate, 3,3'-dimethyl-diphenylmethane-4,4'-diisocyanate, 1,5-diisocyanato-naphthalene, 1,4-diisocyanato-benzene and 1,4- and 1,3-di(isocyanato-dimethyl)-benzene.

26. A radiation curable composition according to claim 21 wherein said aromatic isocyanate is monomeric methylene bis(4-isocyanato benzene).

27. A radiation curable composition according to claim 21 wherein component (a) is the reaction product of hydroxyethylmethacrylate and methylene bis(4-isocyanato benzene) and is present in an amount of 94 wt %, based upon the total weight of component (1) and component (b) is hydroxyethylmethacrylate and is present in an amount of 6 wt %, based upon the total weight of component (1).

28. A radiation curable composition according to claim 21 wherein said aromatic multifunctinal epoxy (meth)acrylate is selected from the group consisting of acrylated diglycidyl ether bisphenol A, acrylated epoxy novolacs, amino modified bisphenol A epoxy acrylates, rubber modified acrylated epoxies and fatty acid modified epoxy acrylates.

29. A radiation curable composition according to claim 21 wherein said aromatic multifunctional epoxy (meth)acrylate is present in an amount of from about 10 to about 60 wt %.

30. A radiation curable composition according to claim 21 wherein said aromatic multifunctional epoxy (meth)acrylate is present in an amount of from about 10 to about 40 wt %.

* * * * *